J. W. STEPHENSON.
ANTI-RAIL CREEPER.
APPLICATION FILED OCT. 17, 1911.
1,093,154. Patented Apr. 14, 1914.
3 SHEETS—SHEET 1.
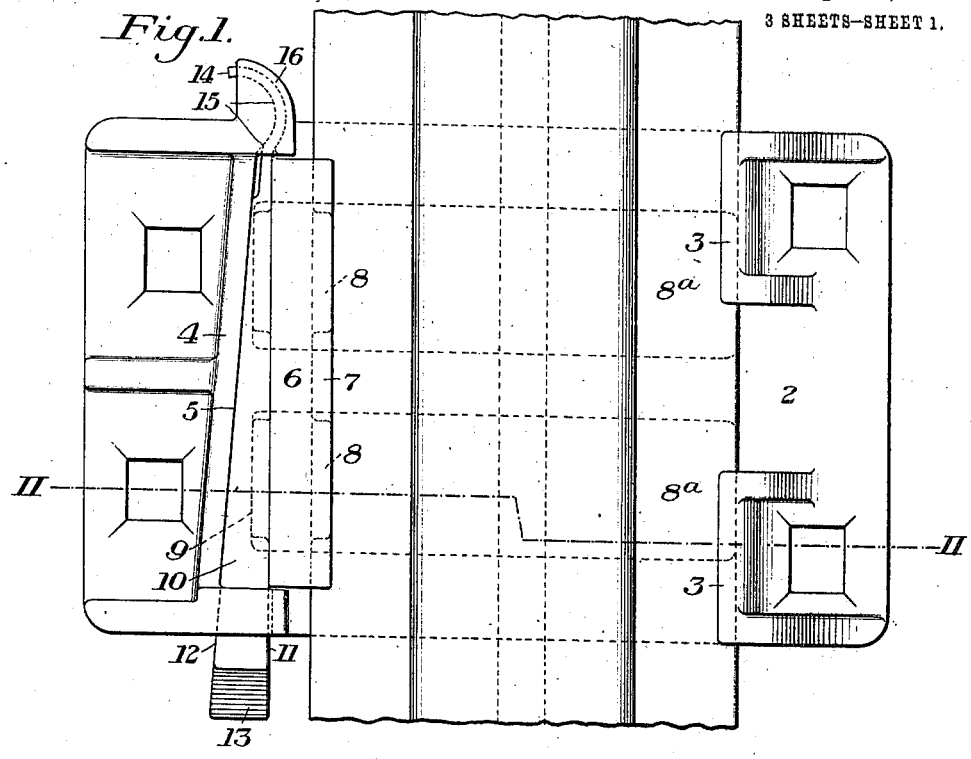
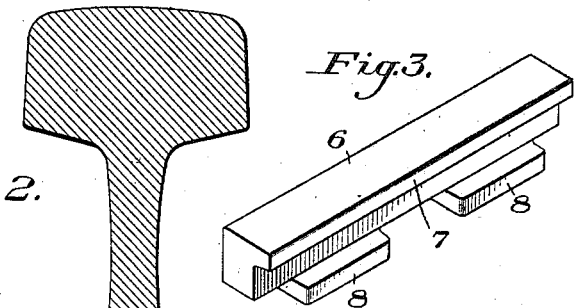
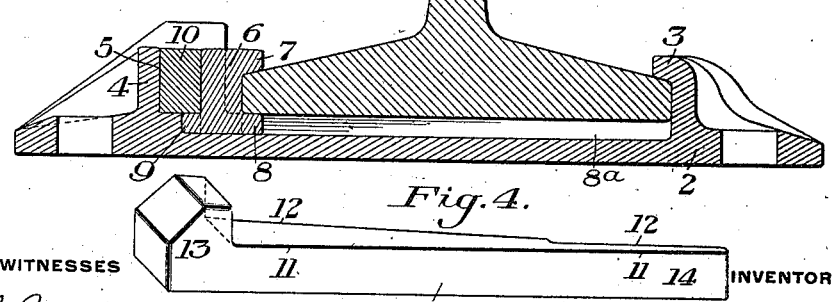
WITNESSES
INVENTOR J. W. STEPHENSON.
ANTI-RAIL CREEPER.
APPLICATION FILED OCT. 17, 1911.
1,093,154.
Patented Apr. 14, 1914.
3 SHEETS—SHEET 2.
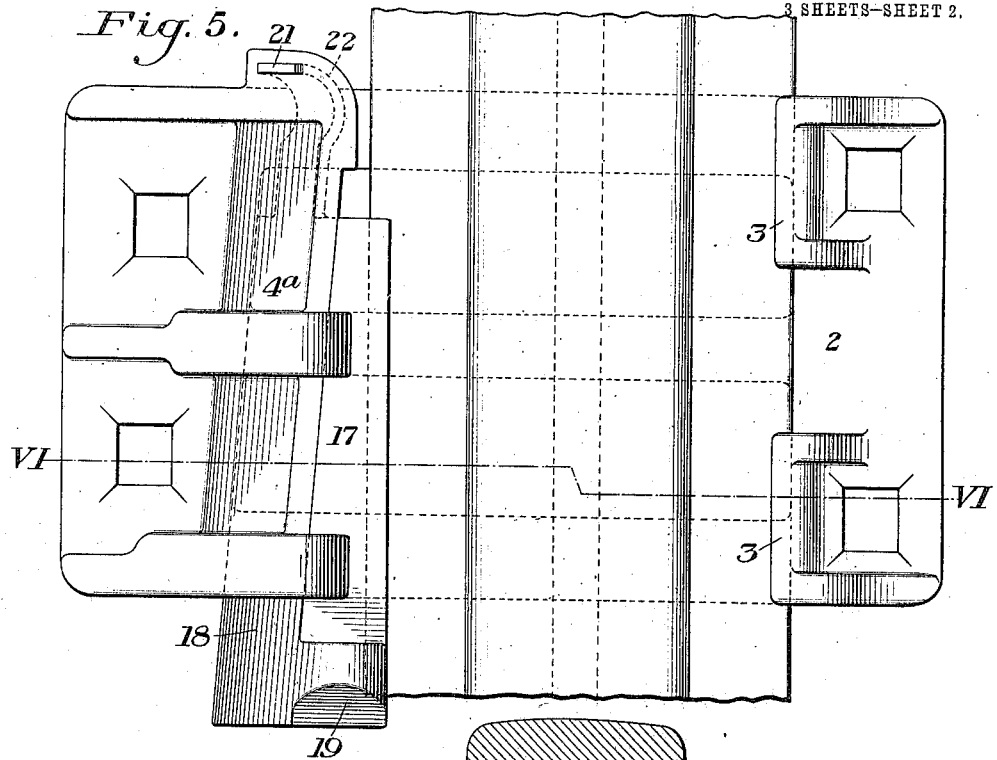
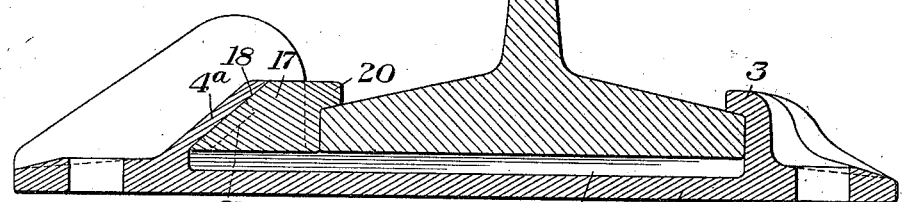
WITNESSES
R. A. Balderson
W. Famariss
INVENTOR
Jno. W. Stephenson,
by Bakewell, Byrnes & Parmelee.
Attys.

J. W. STEPHENSON.
ANTI-RAIL CREEPER.
APPLICATION FILED OCT. 17, 1911.
1,093,154.
Patented Apr. 14, 1914.
3 SHEETS—SHEET 3.
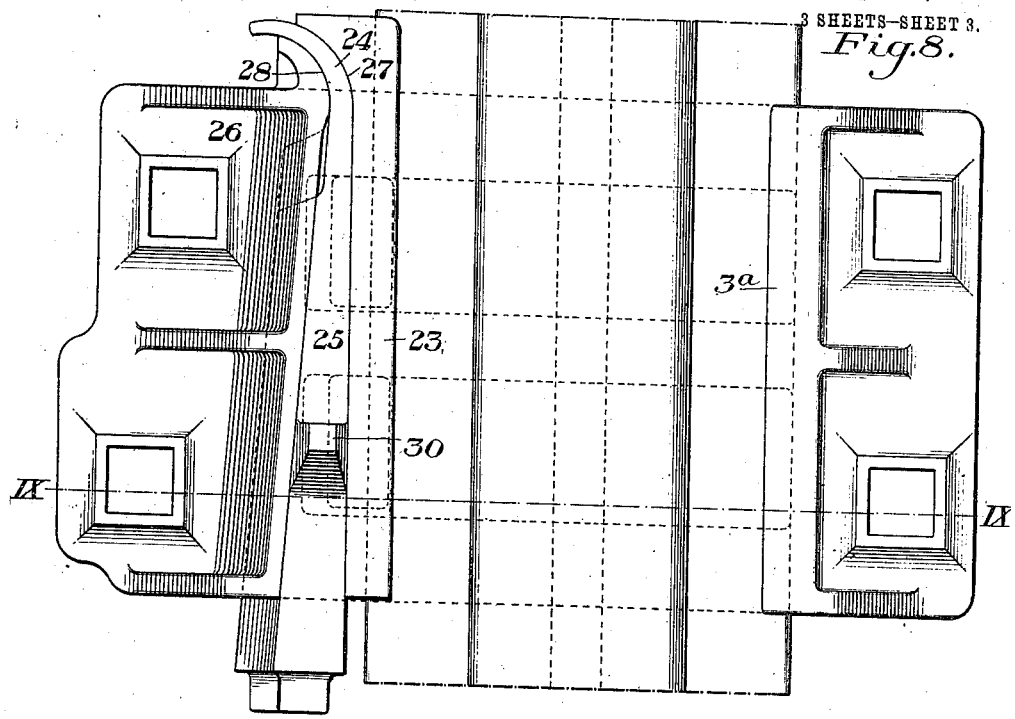
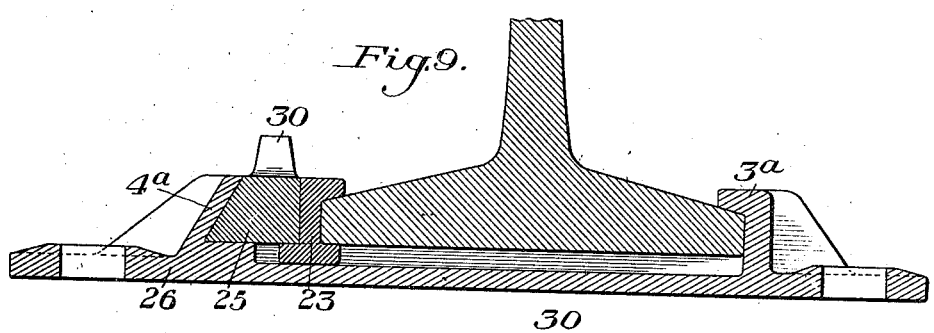
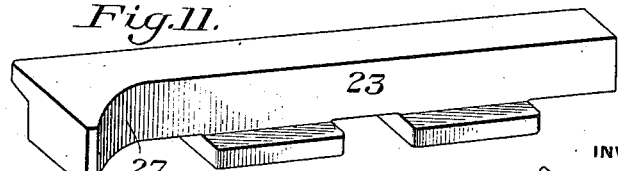
WITNESSES
R A Balderson
W Famariss
INVENTOR
Jno. W. Stephenson
by Bakewell, Byrnes & Parmelee
Attys.

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

ANTI-RAIL-CREEPER.

1,093,154.  Specification of Letters Patent.  Patented Apr. 14, 1914.

Application filed October 17, 1911. Serial No. 655,211.

*To all whom it may concern:*

Be it known that I, JOHN W. STEPHENSON, a resident of Toledo, in the county of Lucas and State of Ohio, have invented a new and useful Improvement in Anti-Rail-Creepers, of which the following is a full, clear, and exact description, reference being had to the accompanying drawings, forming part of this specification, in which—

Figure 1 is a plan view showing my invention applied to a rail; Fig. 2 is a section on the line II—II of Fig. 1; Fig. 3 is a perspective view of the rail-clamping member; Fig. 4 is a perspective view of the bendable key; Figs. 5, 6 and 7 are views similar to Figs. 1, 2 and 4, but illustrating the modification, Fig. 6 being a section on the line VI—VI of Fig. 5; Fig. 8 is a plan view showing still another modification; Fig. 9 is a section on the line IX—IX of Fig. 8; Fig. 10 is a detail perspective view of the key member of Figs. 8 and 9; and Fig. 11 is a perspective view of the rail-clamping member of said figures.

My invention has relation to anticreepers for rails, and is designed to provide simple and efficient means of this character.

It is also designed to provide an anticreeper, in which the rail-engaging members can be securely locked in position against the possibility of being jarred loose in service, the locking of the parts being effected by the act of seating and driving the securing key.

The nature of my invention will be best understood by reference to the accompanying drawings, which will now be described, it being premised, however, that various changes can be made in the details of construction and arrangements of the parts by those skilled in the art, without departing from the spirit and scope of my invention, as defined in the appended claims.

Referring first to that form of my invention shown in Figs. 1 to 4, inclusive, the numeral 2 designates a base member upon which the rail is seated, and which is formed at one side of the rail with the lugs 3, for engagement with one edge portion of the rail base, and which has at the opposite side of the rail an upwardly extending projection 4, whose inner face is inclined longitudinally to form a wedge face 5. 6 designates a clamping member having a top lip 7, which extends over the edge of the base flange of the rail and which also has one or more bottom lips 8, which extend underneath the edge portion of the base of the rail. To seat these lips, the upper surface of the base member is formed with the depressions 8a. These lips preferably also extend to the opposite side of the clamping member, as shown at 9. 10 designates a key or locking member which is formed of malleable metal having a straight side 11, to seat against the outer side of the clamping member 6, and having its opposite longitudinal face 12 tapered longitudinally to correspond to the taper of the wedge face 5, before referred to. This key is formed at one end portion with a driving head 13 and at the opposite end with a reduced bendable extension 14, which, when the key is driven to its seat, is designed to enter a curved bending or deflecting opening or passage 15, which is formed in the base plate 2. In the construction shown, this opening or passage 15 is shown as being formed in a projection 16 of said base plate.

The operation will be readily understood. After the clamping member 6 has been engaged with the rail in the manner shown, the key member is driven between the clamping member and the inner face 5 of the projection 4, and as it is driven to its seat, its bendable end portion 14 engages the opening or passage 15 and is thereby bent or deflected in a manner similar to that shown in Fig. 1, thus giving it a clenched engagement which effectively prevents its working loose or its accidental withdrawal. The key has a holding-down engagement with the lips or projections 9 of the clamping member, as well as a lateral engagement with said member.

The device described forms a very simple and effective means for preventing creeping of rails. The parts are simple in character and construction and can be readily assembled. No particular care on the part of the workmen is necessary to insure the proper locking of the parts, since this is effected by the act of driving the key to its seat.

It will be obvious that the form and details of construction of the base plate, as well as of the clamping member and the key may be widely varied, without departing from the spirit and scope of my invention, as defined in the claims. Thus, in Figs. 5, 6 and 7, I have shown a modification in which the key and clamping member are combined in one piece, this piece being designated by the numeral 17. In this form of the invention, the projection 4ª of the base plate has its inner face not only extending at an angle to the longitudinal axis of the rail, but it is also undercut to fit the bevel face 18 of the member 17. This member has a driving head 19, a rail-base-engaging lip 20, and a reduced bendable extension 21, which is adapted to engage a bending or deflecting opening or passage 22, in the base plate, in a similar manner to that before described.

As above stated, the invention is susceptible of various other modifications.

Figs. 8, 9, 10 and 11 show a still further modification in which the rail-clamping member 23 is made longer than in the forms before described and the bending or deflecting passage or opening for the bendable portion 24 of the securing key 25 is formed partly in this rail-engaging member and partly on the base member 26. That is to say, the rail-engaging member 23 is shown as having the concave depression 27, and the base member 26 is shown as having the convex projection 28, the bendable portion of the key being driven through a space or opening separating such concave and convex portions and being clenched around the latter. This construction provides a positive lock for the member 23. The key is also shown as having a driving-out projection 30 on its upper surface. By driving sufficiently hard on this projection, the key can be forced out of its clenched locking engagement.

I claim:

1. An anti-creeping device comprising a plate having rail receiving flanges and having an inclined surface formed thereon, and a track engaging wedge adapted to be driven between one of the flanges of the plate and the rail and adapted to be bent upon said inclined surface for locking it in position.

2. In an anti-creeper for rails, a base member having a rail-seating portion, a member adapted to be driven longitudinally of the rail into wedging engagement with the base member and between an undercut face of the base member and the base flange of the rail, and means for locking the said members in wedging engagement, comprising a bendable portion upon one of said members adapted to be automatically deflected and locked in a curved guideway upon the other of said members.

3. In an anti-creeper for rails, a base member having a plurality of projections thereon, one of said projections being adapted to engage one base flange of the rail, a second member adapted to be inserted between the other base flange of the rail and the other projection and to be driven longitudinally of the rail and the base member whereby pressure is exerted upon the other base flange of the rail to secure the rail firmly in the device, and a bendable key comprising part of said second member adapted to be bent in a curved guideway in said base member.

4. A track fastening comprising a plurality of members relatively movable longitudinally of the rail into locking engagement with each other, said members having rail-engaging portions, and means for locking said members in wedging engagement comprising a bendable portion integral with one of said members arranged to be automatically deflected and locked in a curved guideway in another of said members.

5. In railway track construction, a base member provided at one side with an upwardly extending portion adapted to engage one of the base flanges of the rail, and at the other side of the base member a projection inclined longitudinally of the rail and forming with the rail a guideway, a wedge member adapted to be driven into the guideway to secure the base member and the rail firmly together, a keyway on the base member, said wedge member having a bendable locking portion adapted to be locked in the keyway in said base member.

6. In railway track construction, a plate having upwardly extending flanges to receive a rail between them, one of said flanges being adapted to take over one side of the base portion of the rail, the other of said flanges having a longitudinally inclined surface, a deflecting channel on said base and a rail engaging wedge adapted to be driven between said surface and the rail and adapted to be bent in the deflecting channel for locking it in position.

7. In railway track construction, a base member having at one side an upwardly extending portion adapted to engage one base flange of the rail and on its other side an upwardly extending portion having an undercut face and being inclined longitudinally of the rail, a deflecting channel on said base, a rail engaging wedge adapted to be driven between the rail and the said face, and having one end adapted to be bent in the deflecting channel for locking it in position.

8. In railway track construction, a base member having at one side an upwardly extending portion for engagement with the base flange of the rail, and having an undercut wedge projection at the opposite side of the base member and a securing device adapted to be driven between said projection and the rail, a deflecting portion on said base member, said securing device having a portion extending over the base flange of the rail and having bendable means adapted to be locked in place by engagement with the deflecting portion of the base member.

In testimony whereof, I have hereunto set my hand.

JOHN W. STEPHENSON.

Witnesses:
  JOHN J. MANNING,
  N. B. MACKENZIE.